United States Patent
Lin et al.

(10) Patent No.: US 7,872,369 B2
(45) Date of Patent: Jan. 18, 2011

(54) BALANCED BRIDGE ELECTRIC GEAR-SHIFTING MECHANISM

(75) Inventors: Chin-Hone Lin, Nantou County (TW); Shih-Hsiang Chien, Yilan County (TW); Pao-Cheng Lin, Hsinchu (TW)

(73) Assignee: Industrial Technology Research Institute, Hsin-Chu (TW)

( * ) Notice: Subject to any disclaimer, the term of this patent is extended or adjusted under 35 U.S.C. 154(b) by 207 days.

(21) Appl. No.: 12/396,843

(22) Filed: Mar. 3, 2009

(65) Prior Publication Data
US 2010/0148746 A1 Jun. 17, 2010

(30) Foreign Application Priority Data
Dec. 11, 2008 (TW) ................ 97148146 A

(51) Int. Cl.
*B60L 1/00* (2006.01)

(52) U.S. Cl. .................................................. 307/9.1
(58) Field of Classification Search ................ 307/9.1
See application file for complete search history.

(56) References Cited

U.S. PATENT DOCUMENTS 7,228,752 B2   6/2007   Tang et al.
7,367,420 B1   5/2008   Sherrod et al.

*Primary Examiner*—Robert L. Deberadinis
(74) *Attorney, Agent, or Firm*—WPAT, PC; Justin King

(57) ABSTRACT

A balanced bridge electric gear-shifting mechanism comprises a signal input stage, a balanced bridge circuit and a signal output stage. The mechanism, by means of inputting different up and down gear signals to enact an analog gear-shifting apparatus to generate different voltage potentials, effectively improves the drawbacks of wrong gear shifting induced by a conventional digital gear shifting apparatus for wrongly touching the up and down shifting gear, so as to reduce the gear-shifting duration, enhance the gear-shifting smoothness, and enhance the system reliability and stability.

8 Claims, 3 Drawing Sheets

| Condition | Theory Voltage(V) | | Practice Voltage(V) | |
|---|---|---|---|---|
| | $F_1$ | $F_2$ | $F_1$ | $F_2$ |
| (1) | 3.864 | 1.932 | 3.84 | 1.94 |
| (2) | 1.932 | 3.864 | 1.98 | 3.86 |
| (3) | 4.264 | 4.264 | 4.16 | 4.24 |
| (4) | 0 | 0 | 0 | 0.084 |

FIG. 4

BALANCED BRIDGE ELECTRIC GEAR-SHIFTING MECHANISM

BACKGROUND OF THE INVENTION

1. Field of the invention

The present invention relates to a balanced bridge electric gear-shifting mechanism, more particularly, to the balanced bridge electric gear-shifting mechanism, by means of inputting different up and down shifting signals to enact an analog gear-shifting apparatus to generate different voltage potentials, effectively improves the drawbacks of wrong gear shifting induced by a conventional digital gear shifting apparatus by wrongly touching the up and down shifting gear, so as to reduce the gear-shifting duration, enhance the gear-shifting smoothness, and enhance the system reliability and stability.

2. Description of the Prior Arts

In the conventional gear-shifting circuit design for vehicles, two identical circuit apparatuses are used to take advantage of individual input voltage signals to judge if shifting up or down the gear, as a conventional digital gear-shifting system circuit structure 10 illustrated by FIG. 1, while an input end T1 and an input end T2 are connected, its voltage is +5 volts, and at the time of open circuit, its voltage is 0 volt. U is a magnetic hysteresis circuit (such as "Schmitt-Trigger Inverter"), and analog signals will be converted into digital signals via said circuit U in the forms of 0 or 1. At output ends O1 and O2, digital signals are transmitted to the CPU in the system in order to meet the commands requested by the system. When the input ends T1 and T2 are connected, the signals at respectively O1, O2 are 1, otherwise, are 0. CPU is functioning properly while T1 and T2 are individually connected, i.e., T1=5V, T2=0V or vice versa. As the electric gear-shifting system is concerned, while T1 turns on but T2 is open-circuited, it is in up-shifting gear state, on the contrary, it is in downshifting gear state. However, if the driver over-presses the gear-shifting button so as to let T1=T2=5V, and then both of output ends O1 and O2 will transmit 1 to the CPU to result in gear-shifting control failure so as to result in the mal-functioning for the car system.

Besides, in case of digital gear-shifting apparatus for adjusting the up or down shifting gear, while the input signal state is changing, the CPU usually accepts a signal with de-bouncing phenomenon, as suggested in FIG. 2. If the delay time is not ready to be set up, the CPU will receive an up-and-down oscillating digital signal, and the oscillation frequency is subject to change according to the gear-shifting system or circuit specification, as a result the controller must be set up properly for its delay time in order to sample the stable signal after the oscillation. If the delay time is too long, the system will be suffering from its response speed, contrarily, said oscillation signal would be a factor of suffering from the smoothness and gear-shifting timing for vehicles.

As the conventional patents are concerned, for example, in R.O.C. Taiwan utility model patent M285482, "Electric button moving forward gear-switching apparatus on electric vehicle", said gear-switching apparatus is disposed on the power box on the electric vehicles, and is mixed up with a axis shaft stretching out said power box such that during the vehicles' moving ahead action a button may be used to serve the application of electric operating gear switching. Also, in R.O.C. Taiwan utility patent, M270938, "Moving forward gear switching differential in electric vehicle", a transmission motor, gearbox, and gear switching control shaft are used to design the gear switching differential, to increase the moving forward speed for electric vehicles. Also, in R.O.C. Taiwan utility patent, M551213, "Gear switching mechanism for electric vehicle", the designed guiding apparatus in the gear switching mechanism based upon the operating shaft according to the path rotation and vibration, is disclosed to switch and control the forward or reverse rotation of the motor and the speed, and to ensure the reverse gear can be only applied at low-speed driving so as to avoid the high-speed backing risk for children electric vehicles.

In regard to US patents, U.S. Pat. No. 7,228,752, "Structure of a gearbox for all terrain vehicles", a gear-switching system is disclosed to improve its gearbox structure so as to provide additional torque and power appropriately to improve the engine efficiency. Also, U.S. Pat. No. 7,367,420, "All terrain vehicle having a rider interface for electronic or mechanical shifting", a gear-switching apparatus for a terrain vehicle is disposed at the left or right ends and said ends are distinguished by their different shapes so as to avoid the wrong press case while the user wears a glove to operate the conventional gear switching button.

Accordingly, as a broad check of domestic or foreign patents, no matter in software design or hardware design, only the improvement of gear switching mechanism and its efficiency is concerned and there lacks a discussion for the interior gear switching circuitry.

SUMMARY OF THE INVENTION

In view of the disadvantages of prior art, the primary object of the present invention relates to a balanced bridge electric gear-shifting mechanism, by means of inputting different up and down gear signals to enact an analog gear-shifting apparatus to generate different voltage potentials, which effectively improves the drawbacks of wrong gear shifting induced by a conventional digital gear shifting apparatus for wrongly touching the up and down shifting gear, so as to reduce the gear-shifting duration, enhance the gear-shifting smoothness, and enhance the system reliability and stability.

To serve the foregoing purposes, the present invention provides, the balanced bridge electric gear-shifting mechanism, which comprises: a signal input stage, for being configured with an up shifting signal input end and a down shifting signal input end, wherein said up shifting signal input end is connected to a first resistor and said down shifting signal input end is connected to a second resistor; a balanced bridge circuit, for being configured with a third resistor, a fourth resistor, and a fifth resistor, wherein the third resistor is arranged in an electric bridge connecting said first resistor to said second resistor; said fourth resistor is disposed for connecting the first resistor to the ground, and said fifth resistor is disposed for connecting the second resistor to ground; and a signal output stage, for being configured with an up shifting signal output end and a down shifting signal output end, wherein said up shifting signal output end is serially connected with the first resistor and the down shifting signal output end is serially connected with the second resistor.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become readily understood from the detailed description given herein below and the accompanying drawings which are given by way of illustration only, and thus are not limitative of the present invention and wherein:

FIG. 4 relates to a comparing table between the embodiment of the present invention and the actual voltage measurements.

DESCRIPTION OF THE EXEMPLARY EMBODIMENTS

The following descriptions are of exemplary embodiments only, and are not intended to limit the scope, applicability, or configuration of the invention in any way. Rather, the following description provides a convenient illustration for implementing exemplary embodiments of the invention. Various changes to the described embodiments may be made in the function and arrangement of the elements described. For your esteemed members of reviewing committee to further understand and recognize the fulfilled functions and structural characteristics of the invention, several exemplary embodiments cooperating with detailed description are presented as the follows.

Figure 1:
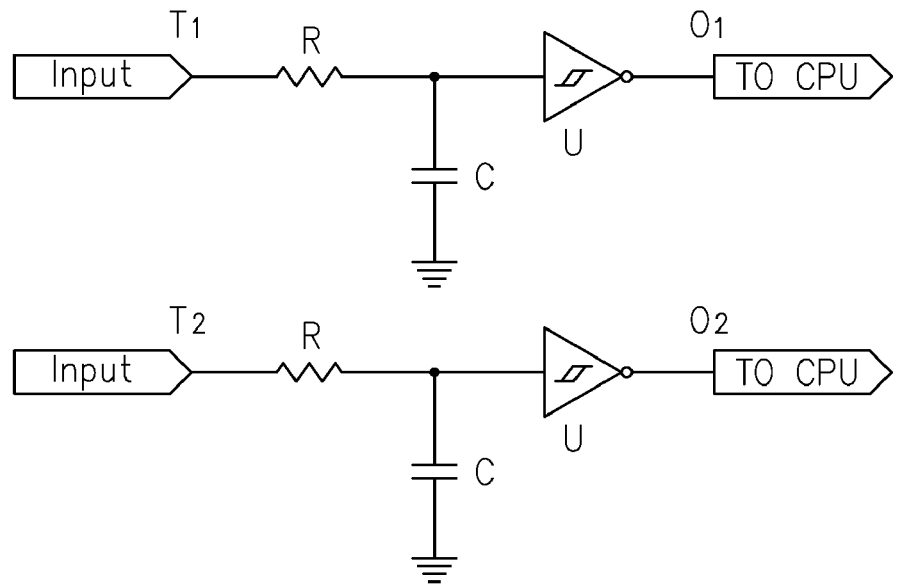
FIG. 1 relates to the circuit diagram of the conventional digital gear shifting system.
Figure 2:
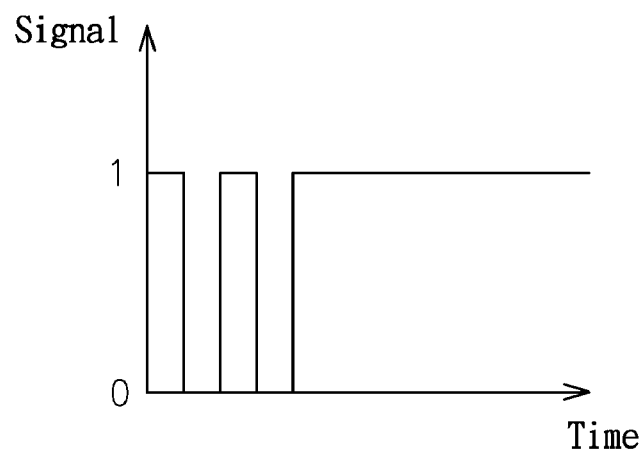
FIG. 2 relates to a de-bouncing perspective view of the conventional digital gear shifting system.
Figure 3:
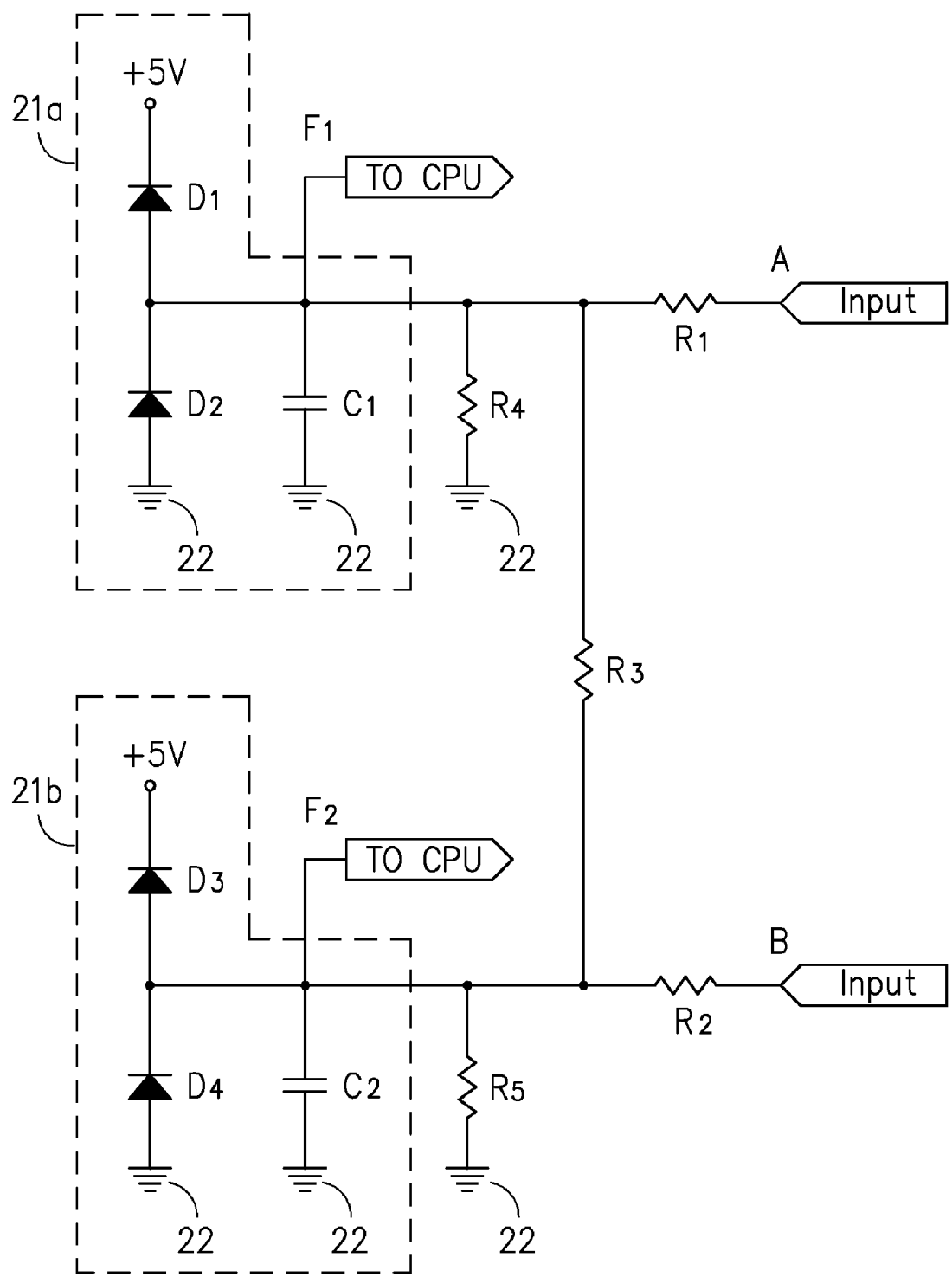
FIG. 3 relates to the circuit diagram of a preferred embodiment according to the present invention.

Please refer to FIG. 3, which illustrates a balanced bridge electric gear-shifting mechanism 20, which comprises a signal input stage, for being configured with an up shifting signal input end A and a down shifting signal input end B, wherein said up shifting signal input end A is connected to a first resistor $R_1$ and said down shifting signal input end B is connected to a second resistor $R_2$, and the input methodology correlated with said up shifting signal input A and said down shifting signal input end B adopt button switching, and said first resistor $R_1$ and said second resistor $R_2$ are the same in term of their resistance and in term of their materials. Said balanced bridge electric gear-shifting mechanism 20 further comprises a balanced bridge circuit, for being configured with a third resistor $R_3$, a fourth resistor $R_4$, and a fifth resistor $R_5$, wherein the third resistor $R_3$ is arranged in an electric bridge connecting said first resistor $R_1$ to said second resistor $R_2$; said fourth resistor $R_4$ is disposed for connecting the first resistor $R_1$ to the ground 22, and said fifth resistor $R_5$ is disposed for connecting the second resistor $R_2$ to ground 22, and said resistor $R_3$, said resistor $R_4$, and said resistor $R_5$ are the same in term of their resistance and in term of their materials so as to enhance the accuracy of signal judgment.

Meanwhile, said balanced bridge electric gear-shifting mechanism 20 further comprises a signal output stage, for being configured with an up shifting signal output end $F_1$ and a down shifting signal output end $F_2$, wherein said up shifting signal output end $F_1$ is serially connected with the first resistor $R_1$ and the down shifting signal output end $F_2$ is serially connected with the second resistor $R_2$, and said up shifting signal output end $F_1$ and said down shifting signal output end $F_2$ are being used to transmit voltage signals to a CPU, and said CPU sets up the gear switching for the controller based upon said voltage signals. Additionally, said up shifting signal output end $F_1$ and said down shifting signal output end $F_2$ are respectively connected to a first protection circuit 21a and a second protection circuit 21b. In regard to said up shifting signal output end $F_1$, said first protection circuit 21a comprises a first diode $D_1$, a second diode $D_2$, and a first capacitor $C_1$, wherein said first diode $D_1$ is connected between said up shifting signal output end $F_1$ and a positive power supply. Preferably, the positive power supply disclosed in the present invention is 5 volts. And, said second diode $D_2$ and said first capacitor $C_1$ are connected between said up shifting signal output end $F_1$ and the ground 22, furthermore, said second protection circuit 21b further comprises a third diode $D_3$, a fourth diode D4 and a second capacitor $C_2$, wherein said third diode $D_3$ is connected between said down shifting signal output end $F_2$ and said positive power supply, said positive power supply is preferably 5 volts, and said fourth diode $D_4$ and said second capacitor $C_2$ are connected between said down shifting signal output end B and said ground 22. Said protection circuits 21a and 21b are used for suppressing the spike signal which would destroy the CPU or cause the malfunctioning situation, and said first capacitor $C_1$ and said second capacitor $C_2$ can be used for reducing system noises.

In the embodiment illustrated in FIG. 3, said up shifting signal output end $F_1$ and said down shifting signal output end $F_2$ are set to be +5 volts while being connected, or set to be open-circuited while being shut down. The four variations at said up shifting signal input end A and said down shifting signal input end B are derived mathematically as follows:

(1) Said up shifting signal input end A is connected to be +5 volts, and said down shifting signal input end B is set to be open-circuited.

The terminal voltage at up shifting signal input side $A =$ $$5 \times \frac{(2R\,//\,R)}{(2R\,//\,R) + R_1}$$

The terminal voltage at up shifting signal input side $B =$ $$5 \times \frac{(2R\,//\,R)}{(2R\,//\,R) + R_1} \times \frac{R}{2R}$$

(2) Said up shifting signal input end A is connected to be open-circuited, and said down shifting signal input end B is set to be +5 volts, The terminal voltage at up shifting signal input side $A =$ $$5 \times \frac{(2R\,//\,R)}{(2R\,//\,R) + R_1} \times \frac{R}{2R}$$

The terminal voltage at up shifting signal input side $B =$ $$5 \times \frac{(2R\,//\,R)}{(2R\,//\,R) + R_1}$$

(3) Said up shifting signal input end A and said down shifting signal input end B are both connected to be +5 volts. According to the theory of superposition, the terminal voltages at said up shifting signal input end A and said down shifting signal input end are respectively calculated and, wherein, the voltage at said up shifting signal input end $A =$ the same at said down shifting signal input end $B =$ $$5 \times \left[ \frac{[R + (R\,//\,R_1)]\,//\,R}{R_1 + [R + (R\,//\,R_1)]\,//\,R} \left(1 + \frac{R_1}{R + R_1}\right) \right]$$

(4) Said up shifting signal input end A and said down shifting signal input end B are both connected to be open-circuited, then the voltage at said up shifting signal input end A=the same at said down shifting signal input end B=0.

From the disclosures corresponding to said case (1)~(4), under different control input signals at said up shifting signal input end A and said down shifting signal input end B, the outcomes at said up shifting signal output end $F_1$ and said down shifting signal output end $F_2$ will be relatively different, and the purpose for gear shifting can be served by the variation characteristics according to the outcomes at said $F_1$ and said $F_2$. While said CPU accepts different voltage signals, four cases (1)~(4) can be served as a basis for setting the gear-shifting controller. Case (1) is an up shifting action, case (2) is a down shifting action, case (3) is namely a case such that the system generates voltages simultaneously, and case (4) is devoid of inputting any voltage value. Case (3) and case (4) can be set up to be the identical situation, namely, to keep the present action state without shifting the gears. According to the circuit structure depicted in FIG. 3, the disclosures in the present invention suggest a gear shifting based on different input voltage cases, even though the simultaneous input signals occur, the gear shifting system mal-functioning can still be avoided due to the differences of the output voltages.

To further verify the circuit system derivation disclosed in the present invention, the circuit of actual gear shifting system is analyzed, together with the forgoing derivation as evidence, to verify the applicability of the circuit system in the present invention. Assuming said first resistor $R_1$ is valued at 100 Ω as its resistance, said second resistor $R_2$ is valued at 510 Ω as its resistance, and the capacitor C is valued at 0.1 μF/50V, and the aforesaid values are substituted into the foregoing mathematic formulas, said cases (1)~(4) can be derived as:

(1) Said up shifting signal input end A is connected to be +5 volts, and said down shifting signal input end B is set to be open-circuited.

The terminal voltage at up shifting signal input side $A =$ $$5 \times \frac{(1020 // 510)}{(1020 // 510) + 100} \cong 3.864$$

The terminal voltage at up shifting signal input side $B =$ $$5 \times \frac{(1020 // 510)}{(1020 // 510) + 100} \times \frac{100}{200} \cong 1.932$$

(2) Said up shifting signal input end A is connected to be open-circuited, and said down shifting signal input end B is set to be +5 volts, The terminal voltage at up shifting signal input side $A =$ $$5 \times \frac{(1020 // 510)}{(1020 // 510) + 100} \times \frac{100}{200} \cong 1.932$$

The terminal voltage at up shifting signal input side $B =$ $$5 \times \frac{(1020 // 510)}{(1020 // 510) + 100} \cong 3.864$$

(3) Said up shifting signal input end A and said down shifting signal input end B are both connected to be +5 volts. According to the theory of superposition, the terminal voltages at said up shifting signal input end A and said down shifting signal input end are respectively calculated and, wherein, the voltage at said up shifting signal input end $A =$ the same at said down shifting signal input end $B =$ $$5 \times \left[ \frac{510 + (510 // 100) // 510}{100 + [510 + (510 // 100)] // 510} \right] \times \left(1 + \frac{100}{510 + 100}\right) \cong 4.264$$

(4) Said up shifting signal input end A and said down shifting signal input end B are both connected to be open-circuited, then the voltage at said up shifting signal input end A=the same at said down shifting signal input end B=0.

For the voltage values measured according to the aforementioned four cases, as illustrated by FIG. 4, the voltages for the mathematical derivation and the same for actual voltage values are extremely close to each others, and it proves the mechanism 20 disclosed in the present invention is applicable, hence, in the actual circuit application, whether to shift the gear can be determined according to the aforesaid; in regard to the aforementioned mathematical derivation embodiments, while said up shifting signal output $F_1$ and said down shifting signal output signal $F_2$ are both equivalent to 4.264V or 0, the CPU will not execute gear shifting at the time of receiving the instruction signal, namely, said mechanism 20 will maintain the status quo gear or shifting, however, while the CPU receives a signal showing that said up shifting signal output end $F_1$ and said down shifting signal output end F2 differ from each other in their end voltages, then the preset electric shifting or gear change will be executed.

To sum up, the balanced bridge electric gear-shifting mechanism 20, by means of inputting different up and down gear signals to enact an analog gear-shifting apparatus to generate different voltage potentials, which effectively improve the drawbacks of wrong gear shifting induced by a conventional digital gear shifting apparatus for wrongly touching the up and down shifting gear, so as to reduce the gear-shifting duration, enhance the gear-shifting smoothness, and enhance the system reliability and stability. Particularly, the disclosures in the present invention are suitable to be applied to the gear shifting circuit in a car with electric gear-shifting function or correlated technical fields.

The invention being thus aforesaid, it will be obvious that the same may be varied in many ways. Such variations are not to be regarded as a departure from the spirit and scope of the invention, and all such modifications as would be obvious to one skilled in the art are intended to be included within the scope of the following claims.

We claim:
1. A balanced bridge electric gear-shifting mechanism, comprising:
a signal input stage, for being configured with an up shifting signal input end and a down shifting signal input end, wherein said up shifting signal input end is connected to a first resistor and said down shifting signal input end is connected to a second resistor;
a balanced bridge circuit, for being configured with a third resistor, a fourth resistor, and a fifth resistor, wherein the third resistor is arranged in an electric bridge connecting said first resistor to said second resistor; said fourth resistor is disposed for connecting the first resistor to the ground, and said fifth resistor is disposed for connecting the second resistor to ground; and
a signal output stage, for being configured with an up shifting signal output end and a down shifting signal output end, wherein said up shifting signal output end is serially connected with the first resistor and the down shifting signal output end is serially connected with the second resistor.

2. The mechanism as recited in claim 1, wherein said up shifting signal output end and said down shifting signal output end of said signal output stage are respectively connected to a first protection circuit and a second protection circuit.

3. The mechanism as recited in claim 2, wherein said first protection circuit connected to said up shifting signal output end further comprises a first diode, a second diode and a first capacitor, wherein said first diode is connected between said up shifting signal output end and a positive power supply, and said second diode and said first capacitor are connected between said up shifting signal output end and a ground; and said second protection circuit connected to said down shifting signal output end comprises a third diode, a fourth diode and a second capacitor, wherein said third diode is connected between said down shifting signal output end and said positive power supply, and said fourth diode and said second capacitor are connected between said down shifting signal output end and said ground.

4. The mechanism as recited in claim 1, wherein said first resistor and said second resistor are the same in term of resistor value.

5. The mechanism as recited in claim 4, wherein said first resistor and said second resistor are the same in term of material.

6. The mechanism as recited in claim 1, wherein said third resistor, said fourth resistor and said fifth resistor are the same in term of resistance.

7. The mechanism as recited in claim 6, wherein said third resistor, said fourth resistor and said fifth resistor are the same in term of material.

8. The mechanism as recited in claim 1, wherein the input methodology recited in said signal input stage adopts button switching.

\* \* \* \* \*